(12) United States Patent
Hoole et al.

(10) Patent No.: US 12,141,046 B2
(45) Date of Patent: Nov. 12, 2024

(54) MACHINE-BASED SECURITY REQUIREMENTS ASSESSMENT

(71) Applicant: MICRO FOCUS LLC, Santa Clara, CA (US)

(72) Inventors: Alexander Hoole, Vancouver (CA); Peter Thomas Blay, Santa Clara, CA (US)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/951,009

(22) Filed: Sep. 22, 2022

(65) Prior Publication Data

US 2024/0103997 A1    Mar. 28, 2024

(51) Int. Cl.
*G06F 11/36*    (2006.01)
*G06F 8/10*    (2018.01)

(52) U.S. Cl.
CPC .......... *G06F 11/3604* (2013.01); *G06F 8/10* (2013.01); *G06F 11/3676* (2013.01)

(58) Field of Classification Search
None
See application file for complete search history.

(56) References Cited

U.S. PATENT DOCUMENTS

| | | | |
|---|---|---|---|
| 8,935,654 B2 * | 1/2015 | Sengupta | G06F 11/3684 717/124 |
| 2004/0102923 A1 * | 5/2004 | Tracy | H04L 63/1433 702/181 |
| 2007/0162890 A1 * | 7/2007 | Meier | G06F 21/577 717/100 |
| 2020/0097388 A1 * | 3/2020 | Bhat | G06F 11/3608 |
| 2020/0159525 A1 * | 5/2020 | Bhalla | G06N 5/022 |
| 2020/0364348 A1 * | 11/2020 | Blass | G06F 8/70 |
| 2021/0081302 A1 * | 3/2021 | Reicher | G06F 11/302 |
| 2022/0131904 A1 * | 4/2022 | Wright | H04L 63/102 |
| 2023/0244596 A1 * | 8/2023 | Tatunashvili | G06F 11/3442 717/124 |

* cited by examiner

*Primary Examiner* — Andrew M. Lyons
(74) *Attorney, Agent, or Firm* — Sheridan Ross P.C.

(57) ABSTRACT

An input regarding security characteristics of a project is received. For example, a security characteristic of a project may be insecure storage of data related to confidentiality. The project is scanned for one or more security requirements based on the received security characteristics. A list of security requirements is built for the project based on the received first input. A machine learning process is used to identify addition of one or more security requirements and/or removal of one or more security requirements from the list of security requirements. A first security vulnerability scan is run using the list of security requirements with the one or more additional security requirements and/or the removed one or more security requirements. Results for the first security vulnerability scan are generated and displayed to a user.

20 Claims, 2 Drawing Sheets

MACHINE-BASED SECURITY REQUIREMENTS ASSESSMENT

CROSS REFERENCE TO RELATED APPLICATION

Cross reference is made to U.S. patent application Ser. No. 17/716,869, filed Apr. 8, 2022, entitled "MACHINE-BASED SOURCE CODE ASSESSMENT", which is incorporated herein by this reference in its entirety.

FIELD

The disclosure relates generally to software scanning and particularly to identifying and filtering tests based on security requirements.

BACKGROUND

The need to ensure computer applications are safe is an ever-increasing priority. Software engineers may be unaware of the impact their application may have in the hands of a nefarious actor. For example, a command in an application code, such as Hypertext Markup Language (HTML) may work as intended but be modified to perform unintended actions, such as obtain access to sensitive data or cause a host computer to perform an undesirable action.

In response, code is often scanned to determine whether errors, vulnerabilities, or other anomalies are present. This may comprise static and/or dynamic analysis. Static analysis is the testing and evaluation of an application by examining the application's source code without executing the application, such as to match a pattern of a portion of the source code to a reference code. If the reference code is known to be problematic, the associated portion of the source code is identified as being similarly problematic.

Dynamic analysis is the testing and evaluation of the application during runtime, such as to provide the application with inputs and observing the outputs. Dynamic analysis may include "fuzzing" (e.g., sending random data to an input), runtime instrumentation, and application scanning to detect many software defects that cause memory errors, input validation flaws, threading errors (e.g., deadlocks, etc.), and/or the like.

The two approaches are complementary because no single approach is likely to find every error or vulnerability. For example, dynamic analysis often reveals subtle defects or vulnerabilities whose cause is too complex due to runtime dependencies/configuration to be discovered by static analysis. Static analysis can be used to examine some or all execution paths and variable values, not just those that are invoked during execution. Thus, static analysis can reveal errors that may not manifest themselves until later, such as after being released to users.

While static and dynamic analysis are effective in identifying many defects, errors, and vulnerabilities, each generates a substantial amount of scan "noise" in the scan results due to findings that are not relevant to the application under test.

SUMMARY

These and other needs are addressed by the various embodiments and configurations of the present disclosure. The present disclosure can provide a number of advantages depending on the particular configuration. These and other advantages will be apparent from the disclosure contained herein.

An input regarding security characteristics of a project is received. For example, a security characteristic of a project may be insecure storage of data related to confidentiality. The project is scanned for one or more security requirements based on the received security characteristics. A list of security requirements is built for the project based on the received first input. A machine learning process is used to identify addition of one or more security requirements and/or removal of one or more security requirements from the list of security requirements. A first security vulnerability scan is run using the list of security requirements with the one or more additional security requirements and/or the removed one or more security requirements. Results for the first security vulnerability scan are generated and displayed to a user.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
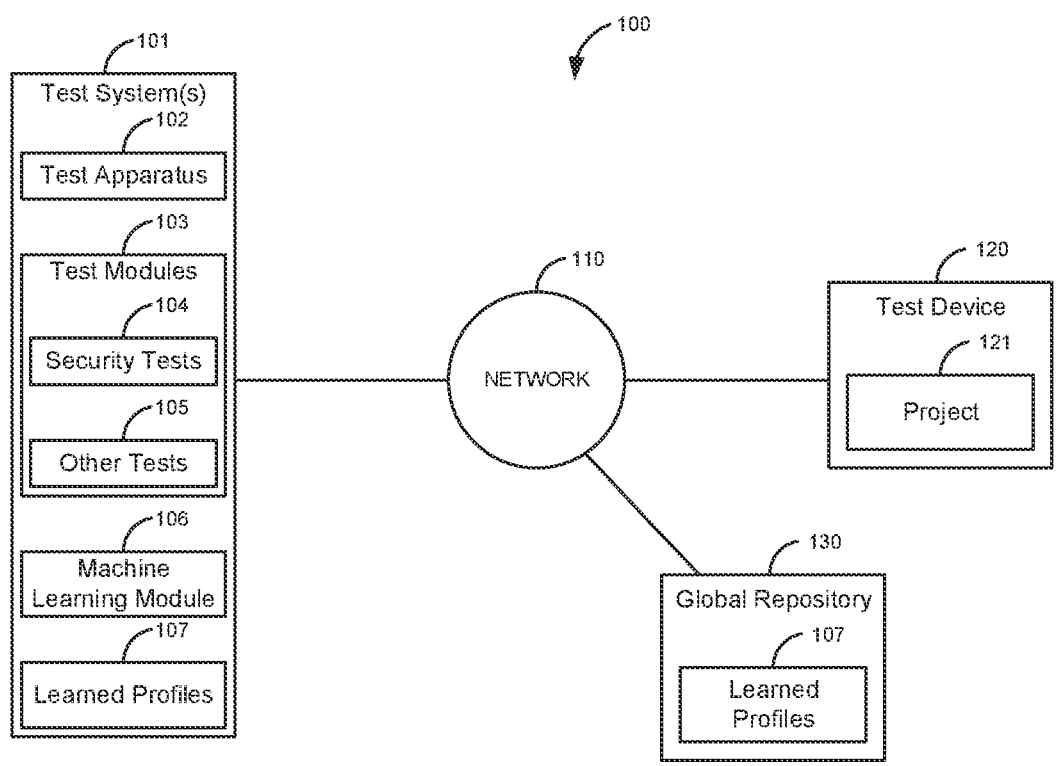
FIG. 1 is a block diagram of a first illustrative system for machine-based security assessment of a project.

FIG. 1 is a block diagram of a first illustrative system 100 for machine-based security assessment of a project 121. The first illustrative system 100 comprises test system(s) 101, a network 110, a test device 120, and a global repository 130.

The system(s) 101 can be or may include any device that can communicate on the network 110 and provide tests for the project 121, such as, a Personal Computer (PC), a telephone, a video system, a cellular telephone, a Personal Digital Assistant (PDA), a tablet device, a notebook device, a smartphone, a server, a test application, and/or the like. As shown in FIG. 1, any number of test system(s) 101 may be connected to the network 110.

The test system(s) 101 further comprises a test apparatus 102, test modules 103, a machine learning module 106, and learned profiles 107. The test apparatus 102 can be or may include any hardware coupled with software that can be used to manage a testing process, such as, a test framework, a test generator, a test application, and/or the like. The test apparatus 102 can do static scanning and dynamic scanning of the project 121. In addition, test apparatus 102 is used to manage the test modules 103. For example, for determining which of the security tests 104/other tests 105 are to be used to scan the project 121.

The test modules 103 can be any group of tests that are used to scan the project 121. The test modules 103 may evaluate a variety of features, such as, protocols, graphical user interfaces, data storage, data integrity, security features, data fault issues, memory issues, malware tests, encryption tests, password testing, thread testing, and/or the like. The test modules 103 comprise security tests 104 and other tests 105.

The security tests 104 are specifically related to evaluating the security of the project 121. The security tests 104 may comprise various types of security tests/scans 104, such as, buffer overflow tests, command injection tests, cookie security tests, cross-site-scripting tests, header manipulation tests, insecure randomness tests, insecure storage tests, insecure transport tests, key management tests, out-of-bounds read tests, password management tests, system information leak tests, Kubernetes misconfiguration tests, thread testing, and/or the like.

The other tests 105 may comprise any other types of tests that a can be run against the project 121, such as, Graphical User Interface (GUI) tests, data entry tests, code correctness tests, dead code tests, null dereference tests, and/or the like. The other tests 105 may be run in conjunction with the security tests 104 to test/scan the project 121.

The security tests 104/other tests 105 may be static tests and/or dynamic tests/scans. Static testing/scanning is the testing and evaluation of the project 121 by examining the source code without executing the project 121. Dynamic testing is the testing and evaluation of the project 121 during runtime. Many software defects that cause memory and threading errors, along with numerous other error types, can be detected both dynamically and statically. The two approaches are complementary because no single approach can find every error. The primary advantage of dynamic analysis is that it reveals subtle defects or vulnerabilities whose cause is too complex due to runtime dependencies/configurations to be discovered by static analysis. The primary advantage of static analysis is that it examines all possible execution paths and variable values, not just those invoked during execution. Thus, static analysis can reveal errors that may not manifest themselves until much later in the testing cycle.

The machine learning module 106 can be or can include any machine learning algorithm that can be used to learn security requirements for evaluating the project 121. For example, the machine learning module 106 may use a K-means clustering algorithm to identify tests that can be grouped together for security testing. The machine learning module 106 may use other types of machine learning algorithms, such as, supervised machine learning, unsupervised machine learning, reinforcement machine learning, and/or the like.

The learned profiles 107 may be profiles tests that are learned by the machine learning process and are associated with a specific project 121 or type of project. For example, as a user provides input on what is relevant for doing security testing of the project 121, this information may be stored in the learned profiles 107.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The test device 120 may be any device that has a project 121, such as, a web server, an application server, an embedded device (e.g., a printer), a personal computer, a gateway, a firewall, a networked device, and/or the like. The project 121 may comprise a software application, a firmware application, multiple applications, an operating system and one or more applications, a hypervisor, a container, a virtual machine, and/or the like. In addition to being on the test device 120, the project 121 may instead reside on the test system(s) 101 or be distributed between the test system(s) 101 and the test device 120.

The global repository 130 is used for storing learned profiles 107 that are gathered from multiple test systems 101. The global repository may consolidate the learned profiles from multiple tests systems 101 to learn over time the best types of scanning/testing/filtering for different types of applications. For example, a learned profile 107 for mobile applications and/or specific types of web applications may be stored in the learned profiles 107 in the global repository 130. The learned profiles 107 in the global repository 130 may be accessed by the test apparatus 102 during the testing/scanning/filtering process.

Figure 2:
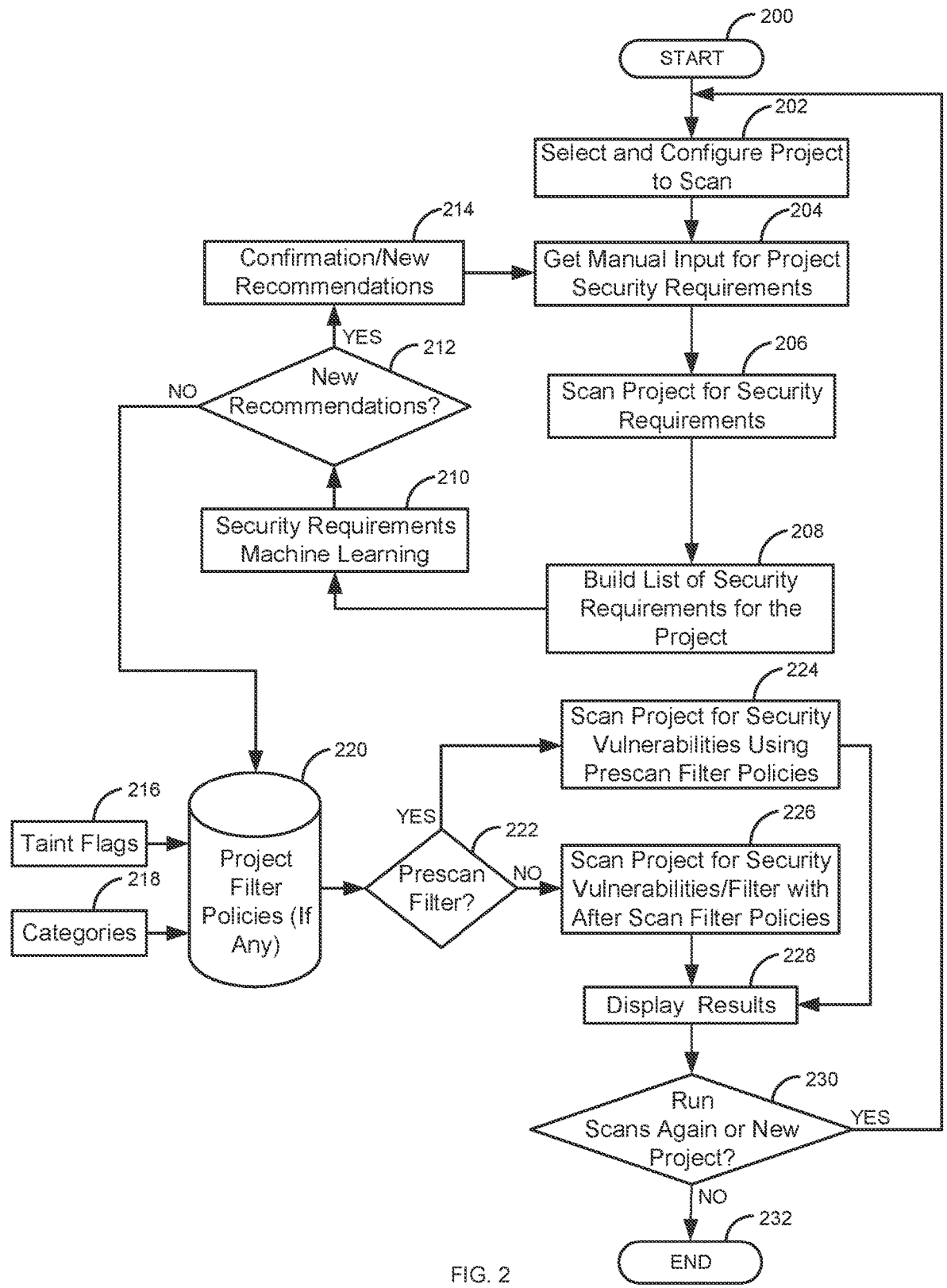
FIG. 2 is a flow diagram of a process for machine-based security assessment of a project.

FIG. 2 is a flow diagram of a process for machine-based security assessment of a project 121. Illustratively, the test system(s) 101, the test apparatus 102, the test modules 103, the security tests 104, the other tests 105, the machine learning module 106, the test device 120, the project 121, and the global repository 130 are stored-program-controlled entities, such as a computer or microprocessor, which performs the method of FIG. 2 and the processes described herein by executing program instructions stored in a computer readable storage medium, such as a memory (i.e., a computer memory, a hard disk, and/or the like). Although the method described in FIG. 2 is shown in a specific order, one of skill in the art would recognize that the steps in FIG. 2 may be implemented in different orders and/or be implemented in a multi-threaded environment. Moreover, various steps may be omitted or added based on implementation.

The process starts in step 200. A user selects and configures a project 121 to scan. For example, the user may select the project 121 from a list of projects to evaluate. The selection process may include selecting which components/applications/libraries are part of the project 121. The configuration process may comprise various options, such as, a number of test systems 101 to use, specifying specific security scans to run, and/or the like. The testing apparatus 102 gets manual input for project security requirements for the project 121. For example, the project 121 may have stored metadata that is associated with different parts of the project 121 as shown below in Table 1.

TABLE 1

| Category | Subcategory | Confidentiality | Integrity | Availability |
| --- | --- | --- | --- | --- |
| Buffer Overflow (write) | | None | Compete | Partial |
| Code Correctness | Erroneous Null Comparison | None | Partial | None |
| Command Injection | | Partial | Complete | Partial |
| Cookie Security | Cookie not Sent over SSL/TLS | Complete | None | None |
| Cross-Site-Scripting | Reflected | Partial | Complete | None |
| Dead Code | Unused Method | None | None | None |
| Header Manipulation | | Partial | Complete | None |
| Insecure Randomness | | None | Complete | None |
| Insecure Storage | Insufficient Data Protection | Complete | Complete | None |
| Insecure Transport | | Complete | None | None |
| Key Management | Empty Encryption Key | Partial | Complete | None |
| Null Dereference | | None | None | Partial |
| Out-of-Bounds Read | | Partial | Partial | None |
| Password Management | Empty Password | Partial | Complete | None |
| System Information Leak | | Partial | None | None |
| Kubernetes Misconfiguration | Unbound Scheduler | None | None | Partial |

For the application under analysis, the user may select the overall security requirements for the application profile (confidentiality, integrity, availability). For each of the categories/subcategories the user may manually enters/selects the categories in step 204. The user selects which of the categories (the overall security requirements) apply to the application being scanned. For example, a Java application does not allow for buffer overflows due to Java's memory management process, so the buffer overflow category may be automatically removed, or the user can select to remove the buffer overflow category to eliminate unnecessary scans. Furthermore, an application under analysis may have a defined security requirement specified which captures the relevant confidentiality, integrity, and availability profile. For example, a free video game that does not collect any user data has no confidentiality, integrity, or availability requirements that would prevent release. Whereas a banking application will have very specific needs for each (confidentiality, integrity, and availability). The intersection of the requirement categories, such as those in Table 1, with the overall security requirements of the application provide the baseline for determining relevancy of results and implied filtering.

In Table 1, the security rating for each category (Confidentiality, Integrity, Availability) of vulnerability/weakness has three possible levels: 1) none, 2) partial, and 3) complete. None means that there are no security requirements violated by a category/subcategory. Partial means that there may be some security requirements violated by a category/subcategory. Complete means that the category/subcategory may completely violate the security requirements. As one of skill in the art would recognize, different levels may be used. For example, a scale of one to ten may be used for the levels.

In Table 1, there are three defined security requirements: 1) confidentiality, 2) integrity, and 3) availability. Depending on the project 121, there may be more or less security requirements. Confidentially refers to confidentiality of data. For example, if specific data has been encrypted and has restricted access, then any scans associated with access to the encrypted data would have a complete security rating. Integrity refers to keeping the integrity of data. For example, data that is stored in a database or memory may be checked to make sure it is not being corrupted. If the database/memory can become corrupted, then the security level would be complete. Availability is associated with how long a project 121 is available. For example, if an application/container is running in a cloud service that is supposed to be always running, the security rating may be complete. The test apparatus 102 scans the project 121 for security requirements in step 206. Step 206 may also use attribute tags associated with the source code/categories. For example, specific scans/tests may have associated attribute tags similar to those described in Table 1. This may include searching metadata associated with the project 121. For example, the test apparatus 102 may check code of the project 121 using static analysis to determine if there is any encryption code indicated by the metadata. Step 206 may also use dynamic analysis. If there is encryption code, the test apparatus 102 may scan for encryption key mismanagement or storage of unencrypted data. The test apparatus 102 builds a list of security requirements for the project 121 in step 208.

The machine learning module 106 takes the list of security requirements and applies machine learning to the list of security requirements in step 210. For example, the machine learning module 106 may use previous lists of security requirements (e.g., stored in the learned profiles 107 either locally or in the global repository 130) for the project 121 or list of security requirements from other projects 121 to make new recommendations in step 212. The machine learning module 106 may identify additional vulnerability/weakness categories that may have security requirements for the project 121 even though the user did not indicate that the application or related categories has any related security requirements. For example, the static analysis identified encryption code. The machine learning module 106 may identify additional security requirements and/or recommend the removal of security requirements. Information about the new recommendations can be presented to the user in step 212.

The user then can confirm/override the new recommendations in step 214. The process then goes back to step 204 to repeat the process of refining the security requirements for the projects 121 until there are not any new recommendations in step 212.

If there are no more recommendations in step 212, the test apparatus 102 determines, in step 220, if there are any filter policies for the project 121. The filter policies are based on the taint flags 216 and the categories 218. The taint flags 216 and the categories 218 are inputs that control what is filtered in step 220. The taint flags 216 are used to identify specific scans that are to be filtered. The categories 218 are used to filter out scans for specific types of categories. For example, the category 218 may be to filter out dead code scans/information.

The filter policies of step 220 are used to filter out noise that is unrelated to the genealogy of the project 121. In other words, the filter policies of step 220 are about reducing the set security requirements to those that are relevant to the user of the project 121. For example, if the user is looking to filter out noise/unnecessary scans based upon the security requirements, the resulting filters may be based upon the list of security requirements combined with existing taint flags and categories. If a user is only interested in Confidentiality/Integrity and Access (CIA) related weakness/vulnerability categories, then those categories/subcategories related to code quality (and not impacting CIA) can be filtered out. Alternatively, those categories/subcategories which are tied to the taint flag for insecure data will be retained if confidentiality is deemed relevant.

Once the filter policies are determined in step 220, the test apparatus 102 determines, in step 222, what types of filters are used in the project 121. In FIG. 2, there are two types of filter polices: 1) prescan filter policies, and 2) after scan filter policies. Prescan filter policies are used to specify specific scans that are not going to be used. The after scan polices are used to filter out scan results after the scans are run against the project 121. If there are prescan filters in step 222, the project 121 is scanned using the prescan filter policies in step 224. If there are not any prescan filters in step 222, the project 121 is scanned based on the after-scan filter polices in step 226. In one embodiment, there may be both prescan filters and after scan filters. In this embodiment, steps 224 and 226 will both be implemented.

The results are then displayed to the user in step 228. The displayed results of step 228 allow the user to dynamically filter out/refine scan results that are only applicable to the project 121. This makes the display of the information much more efficient than could be previous achieved. In addition, by filtering out all the unnecessary scan information, it allows the user to more efficiently identify and fix bugs/problems, which results in faster/more efficient software development.

The test apparatus 102 determines if there are new scans to run or a new project 121 is to be scanned in step 230. If there are new scans to run or a new project 121 is to be scanned in step 230 the process goes to step 202. Otherwise, the process ends in step 232.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   a microprocessor; and
   a computer readable medium, coupled with the microprocessor and comprising microprocessor readable and executable instructions that, when executed by the microprocessor, cause the microprocessor to:
   receive first input regarding security characteristics of a project;
   scan the project for one or more security requirements based on the received first input;
   build a list of security requirements for the project based on the received first input;
   use a machine learning process to identify addition of one or more security requirements and/or removal of one or more security requirements from the list of security requirements;
   receive filtering input for filter policies for the project to filter out specific types of scans and specific types of information from scans after identifying the addition of the one or more security requirements and/or the removed one or more security requirements;
   run a first security vulnerability scan using the list of security requirements with the additional one or more security requirements and/or the removed one or more security requirements; and
   generate for display, results for the first security vulnerability scan.

2. The system of claim 1, wherein the additional one or more security requirements are provided to a user to select which of the additional one or more security requirements will be used in the first security vulnerability scan.

3. The system of claim 2, wherein the selected additional one or more security requirements are stored for a second security vulnerability scan and wherein the selected additional one or more security requirements are associated with a specific type of project in a global repository.

4. The system of claim 1, wherein the removal of the one or more security requirements are provided to a user to select which ones of the one or more security requirements will be removed in the first security vulnerability scan.

5. The system of claim 1, wherein the filtering input comprises prescan filter requirements and wherein the prescan filter requirements filter out one or more scans to be run during the first security vulnerability scan.

6. The system of claim 1, wherein the filtering input comprises after-scan filter requirements and wherein the after-scan filter requirements filter out scan results for scans run during the first security vulnerability scan.

7. The system of claim 1, wherein scanning the project for the one or more security requirements comprises at least one of: buffer overflow code, code correctness, command injection code, cookie security code, cross-site scripting code, dead code, header manipulation code, insecure randomness code, insecure data storage, insecure transport of data, insecure encryption key management, null deference code, out-of-bounds read code, insecure password management, a system information leak, and a Kubernetes misconfiguration.

8. The system of claim 1, wherein building the list of security requirements comprises looking at attribute tags associated with the scan of the project.

9. A method, comprising:
   receiving, by a microprocessor, first input regarding security characteristics of a project;
   scanning, by the microprocessor, the project for one or more security requirements based on the received first input;
   building, by the microprocessor, a list of security requirements for the project based on the received first input;
   using, by the microprocessor, a machine learning process to identify addition of one or more security requirements and/or removal of one or more security requirements from the list of security requirements;
   receiving, by the microprocessor, filtering input for filter policies for the project to filter out specific types of scans and specific types of information from scans after identifying the additional one or more security requirements and/or the removed one or more security requirements;
   running, by the microprocessor, a first security vulnerability scan using the list of security requirements with the additional one or more security requirements and/or the removed one or more security requirements; and
   generating for display by the microprocessor, results for the first security vulnerability scan.

10. The method of claim 9, wherein the additional one or more security requirements are provided to a user to select which of the additional one or more security requirements will be used in the first security vulnerability scan.

11. The method of claim 10, wherein the selected additional one or more security requirements are stored for a second security vulnerability scan and wherein the selected additional one or more security requirements are associated with a specific type of project in a global repository.

12. The method of claim 9, wherein the removal of the one or more security requirements are provided to a user to select which ones of the one or more security requirements will be removed in the first security vulnerability scan.

13. The method of claim 9, wherein the filtering input comprises prescan filter requirements and wherein the prescan filter requirements filter out one or more scans to be run during the first security vulnerability scan.

14. The method of claim 9, wherein the filtering input comprises after scanafter-scan filter requirements and wherein the after-scan filter requirements filter out scan results for scans run during the first security vulnerability scan.

15. The method of claim 9, wherein scanning the project for the one or more security requirements comprises at least one of: buffer overflow code, code correctness, command injection code, cookie security code, cross-site scripting code, dead code, header manipulation code, insecure randomness code, insecure data storage, insecure transport of data, insecure encryption key management, null deference code, out-of-bounds read code, insecure password management, a system information leak, and a Kubernetes misconfiguration.

16. The method of claim 9, wherein building the list of security requirements comprises looking at attribute tags associated with the scanning of the project.

17. A non-transient computer readable medium having stored thereon instructions that cause a processor to execute a method, the method comprising instructions to:
  receive first input regarding security characteristics of a project;
  scan the project for one or more security requirements based on the received first input;
  build a list of security requirements for the project based on the received first input;
  use a machine learning process to identify addition of one or more security requirements and/or removal of one or more security requirements from the list of security requirements;
  receive filtering input for filter policies for the project to filter out specific types of scans and specific types of information from scans after identifying the additional one or more security requirements and/or the removed one or more security requirements;
  run a first security vulnerability scan using the list of security requirements with the additional one or more security requirements and/or the removed one or more security requirements; and
  generate for display, results for the first security vulnerability scan.

18. The non-transient computer readable medium of claim 17, wherein the additional one or more security requirements are provided to a user to select which of the additional one or more security requirements will be used in the first security vulnerability scan.

19. The non-transient computer readable medium of claim 18, wherein the selected additional one or more security requirements are stored for a second security vulnerability scan and wherein the selected additional one or more security requirements is associated with a specific type of project in a global repository.

20. The non-transient computer readable medium of claim 17, wherein the removal of the one or more security requirements are provided to a user to select which ones of the one or more security requirements will be removed in the first security vulnerability scan.

* * * * *